(12) United States Patent
Bozic

(10) Patent No.: US 10,828,709 B2
(45) Date of Patent: Nov. 10, 2020

(54) KEYHOLE SAW BLADE OR SABRE SAW BLADE FOR A POWER TOOL

(71) Applicant: Robert Bosch GmbH

(72) Inventor: Milan Bozic, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/408,757

(22) Filed: May 10, 2019

(65) Prior Publication Data

US 2019/0270148 A1 Sep. 5, 2019

Related U.S. Application Data

(62) Division of application No. 14/365,155, filed as application No. PCT/EP2012/071986 on Nov. 7, 2012, now Pat. No. 10,406,615.

(30) Foreign Application Priority Data

Dec. 20, 2011 (DE) .......................... 10 2011 089 110

(51) Int. Cl.
*B23D 49/10* (2006.01)
*B23D 61/12* (2006.01)

(52) U.S. Cl.
CPC .............. *B23D 61/12* (2013.01); *B23D 49/10* (2013.01); *B23D 61/123* (2013.01); *B23D 61/128* (2013.01)

(58) Field of Classification Search
CPC .... B23D 61/12; B23D 61/123; B23D 61/128; B23D 49/10

(Continued)

(56) References Cited

U.S. PATENT DOCUMENTS

| 4,036,236 A | 7/1977 | Rhodes, Jr. |
| 4,345,499 A | 8/1982 | Ross |

(Continued)

FOREIGN PATENT DOCUMENTS

| DE | 1 503 939 A | 9/1969 |
| DE | 35 29 844 A1 | 3/1986 |

(Continued)

OTHER PUBLICATIONS

International Search Report corresponding to PCT Application No. PCT/EP2012/071986, dated Feb. 20, 2013 (German and English language document) (8 pages).

*Primary Examiner* — Omar Flores Sanchez
(74) *Attorney, Agent, or Firm* — Maginot, Moore & Beck LLP

(57) ABSTRACT

In accordance with one embodiment, an integrally formed saw blade includes a cutting edge extending along an axis from a distal front tip to a proximal rear portion, the cutting edge includes a portion with cutting teeth and a portion with no cutting teeth. A lateral edge extends along the axis from the distal front tip of the saw blade to the proximal rear portion of the fixing shank. A blade portion, with a maximum height defined by the cutting edge and the lateral edge, terminates at a corner. A fixing shank with a maximum height defined by the cutting edge and the lateral edge that is shorter than the blade portion terminates at the cutting teeth. A transition region extends from the fixing shank to the blade portion, and at least two spaced apart impressions are formed in the transition region but do not extend into the blade portion.

17 Claims, 4 Drawing Sheets

(58) Field of Classification Search
USPC .............................. 30/392–394, 346.61, 351
See application file for complete search history.

(56) References Cited

U.S. PATENT DOCUMENTS

| | | |
|---|---|---|
| 7,833,241 B2 | 11/2010 | Gant |
| D688,543 S | 8/2013 | Neitzell |
| 8,734,450 B2 | 5/2014 | Landon |
| 9,475,141 B2 | 10/2016 | Butzen et al. |
| 10,226,829 B2 | 3/2019 | Butzen et al. |
| 2002/0184988 A1 | 12/2002 | Rohrman |
| 2004/0187320 A1 | 9/2004 | Haut |
| 2006/0016315 A1 | 1/2006 | Zorich |
| 2009/0044679 A1 | 2/2009 | Souza et al. |
| 2011/0226029 A1 | 9/2011 | Boguslawskij |
| 2018/0071847 A1* | 3/2018 | Kazda ................. B23D 61/123 |
| 2018/0085838 A1* | 3/2018 | Green ..................... B26B 9/02 |

FOREIGN PATENT DOCUMENTS

| | | |
|---|---|---|
| DE | 100 14 222 A1 | 9/2001 |
| GB | 2 179 593 A | 3/1987 |
| JP | 2007-326194 A | 12/2007 |
| TW | 434070 B | 5/2001 |
| WO | 2011/063438 A1 | 6/2011 |

\* cited by examiner

KEYHOLE SAW BLADE OR SABRE SAW BLADE FOR A POWER TOOL

This application is a divisional application of U.S. application Ser. No. 14/365,155, filed Jun. 13, 2014, which issued as U.S. Pat. No. 10,406,615 on Sep. 10, 2019, and which is a 35 U.S.C. § 371 National Stage Application of PCT/EP2012/071986, filed on Nov. 7, 2012, which claims the benefit of priority to Serial No. DE 10 2011 089 110.2, filed on Dec. 20, 2011 in Germany, the disclosures of which are incorporated herein by reference in their entirety.

TECHNICAL FIELD

The disclosure relates to a jigsaw blade or reciprocating saw blade for a power tool.

BACKGROUND

U.S. Pat. No. 4,036,236 describes a jigsaw blade or reciprocating saw blade for a surgical saw, said saw blade having a rectilinear blade body at a fixing shank, wherein a longitudinal edge of the blade body forms the cutting edge having cutting teeth. A groove-like depression has been introduced into the saw blade along the entire axial length, said depression being produced by indentation on one of the lateral surfaces of the saw blade, such that, on the opposite lateral surface, a corresponding linear or strip-form protrusion is produced along the length of the saw blade. Bending vibrations of the saw blade, which is embodied in a thin manner, are intended to be reduced by way of the groove on one side and the protrusion on the opposite side.

GB 2 179 593 A describes a saw blade for a jigsaw or reciprocating saw, said saw blade having a plurality of grooves in the lateral surfaces, said grooves extending in the longitudinal direction, that is to say parallel to the cutting edge having the teeth. As a result of the introduction of the grooves, contact between the lateral surfaces of the saw blade and the workpiece to be machined is intended to be reduced and thus the friction minimized.

SUMMARY

The disclosure is based on the object of using simple design measures to configure a saw blade for a jigsaw or reciprocating saw, which executes an oscillating reciprocating movement during operation, such that precise workpiece machining is possible over a long operating period.

This object and more is achieved according to the disclosure.

The disclosure relates to a saw blade for a jigsaw or reciprocating saw, which executes an oscillating, reciprocating working movement in translation during operation. The saw blade has a blade body having a cutting edge on which cutting teeth are arranged, and also a fixing shank, formed in one piece with the blade body, for fixing in a receiving device of the power tool. At least one impression has been introduced into the blade body and/or into the fixing shank, said impression increasing the strength and changing the tension properties of the saw blade, with the result that both the natural frequency of the saw blade and the propagation of vibrations or transverse oscillations in the saw blade are positively influenced. As a result of the impression, the material in the saw blade is usually compressed. In the case of high point loads on the saw blade, too, for example in the event of the saw blade coming into contact with a hard article, or in the case of high bending load, the risk of breakage is reduced on account of the increased rigidity or strength which is achieved via the impression. Accordingly, there is increased operational reliability, and the quality of the work result is also improved and can be maintained over a longer operating period.

It is furthermore advantageous that the impression can be produced in a simple manner. The impression results in strain hardening in the blade body and thus in a changed tension property.

The impression can be produced by stamping; in this case, an impression in the form of a depression is present on one lateral surface of the blade body, while on the opposite lateral surface the stamping produces a corresponding ridge. The impressions produced by stamping have an impressed depth of preferably at least 0.1 mm. The impressions can all be introduced into the same lateral surface, such that only depressions are present on this lateral surface and only elevations are present on the opposite lateral surface. Alternatively, it is also possible to provide impressions on each lateral surface, such that each of the two lateral surfaces has depressions and ridges.

However, it is also possible to produce the impression by rolling, in particular by simultaneous rolling on both lateral surfaces of the blade body, in that the saw blade is moved through between two counterrotating rollers, such that impressions in the form of depressions are arranged on both lateral surfaces and the material in the blade body is compressed in the region of the impression. In the case of impressions produced by rolling, the impressed depth is preferably at most one third of the blade thickness, for example at most 0.2 mm or 0.1 mm, and may optionally be located in the region of hundredths of a millimeter, for example 0.01 mm. It is also advantageous in this case that the saw blade is indented from opposite sides, such that no elevations arise on a lateral surface of the saw blade. The rolled impressions are located on both lateral surfaces of the saw blade and are in particular arranged in a mirror-symmetrical manner with respect to one another. The rolled impression is not a groove but an indentation which is scarcely visible or noticeable from the outside and results in material compression in the blade body and thus in a changed tension property. Accordingly, the impression does not serve for improved chip removal, for dissipation of heat or for reducing the frictional contact with the workpiece to be machined, but for increasing the rigidity and a desired change in the tension property.

Optionally, chemical finishing treatments, for example by coating, can be carried out locally in the saw blade in addition to the impressions in order to influence the tension in the saw blade. Alternatively or in addition, local thermal finishing treatments, for example induction harden, are also possible.

Impressions embodied in different manners may be suitable. For example linear or strip-form impressions, which are either embodied in a rectilinear or curved manner or may have rectilinear and curved sections, are possible. In the case of a linear impression, the width is very small, and in the case of a strip-form impression, the width is preferably at most one third of the blade height, for example 3 mm, although greater widths are also possible, if appropriate. Planar impressions on the saw blade are also possible in principle.

It is furthermore possible, in particular in the case of a linear impression, to produce geometric patterns that are configured in a peripherally closed manner, for example approximately rectangular impressions, triangular impressions or the like. The impression per se is linear or strip-form and forms the peripheral contour of the geometric pattern.

It may be expedient for the impression, in the case of a linear or strip-form configuration, to extend at least sectionally in the longitudinal direction, that is to say parallel to the cutting edge. However, an angular orientation of the linear or strip-form impression with respect to the longitudinal axis, or an orthogonal course, that is to say in the transverse direction of the saw blade, are also possible in principle. Furthermore, different types of patterns of impressions which are representable as a combination of different impressions, for example a combination of rectilinear impressions which extend sectionally in the longitudinal and transverse directions and/or at an angle to the longitudinal axis, are possible.

Defined patterns of impressions which change depending on the axial position are also possible.

The linear or strip-form impressions can have been introduced into the blade body such that at least two corners of the blade body are connected by the impressions. Preferably, all four corners of the blade body are connected by linear or strip-form impressions, although different variant embodiments are suitable in principle. It is possible for example to introduce diagonally extending impressions which connect diagonally located corners of the blade body. In addition or alternatively, a connection via impressions extending in the longitudinal direction or in the transverse direction between the corners in the blade body is suitable. A frame structure with impressions is created both with diagonal impressions and with impressions that extend in the longitudinal direction or transversely to the longitudinal direction, said frame structure significantly improving the strength of the blade body. The diagonal impressions and/or impressions extending in the longitudinal direction or transverse direction can extend as far as the respective corners. However, according to a further embodiment, it is also possible for such an impression to be located at a distance from one or two corners, with in this case the longitudinal axis of the impression leading through the corners.

It may be expedient to provide one or more impressions next to the fixing shank or in the transition region between the blade body and the fixing shank, since the transition region is highly stressed in particular in the case of high bending loads, and the strength in the transition region can be increased by the introduction of the impressions, such that the risk of breakage is reduced. The impressions can be arranged on the fixing shank and/or immediately adjacent to the fixing shank on the blade body.

At least one cutout may have been introduced into the blade body, said cutout being delimited by at least one impression. The cutout, which may be produced for example by punching, reduces the mass moment of inertia of the blade body, this having a positive effect, in particular with regard to reduced transmission of vibrations, on the useful life and user-friendliness. Furthermore relatively small-size drive motors can be used. The impression in the blade body counteracts a reduction in stability brought about by the cutout. Thus, as a result of the combination of cutout and impression, various advantages can be combined, specifically a reduced mass or a mass moment of inertia and improved stability with reduced propagation of vibrations.

Advantageously, a plurality of cutouts have been introduced into the blade body, said cutouts each being delimited by at least one, preferably linear or strip-form impression. It may be expedient to provide impressions on at least two sides of a cutout, optionally on all sides of the cutout, in order to counteract the reduction in the stability that is brought about by the cutouts.

Various cross-sectional geometries of the cutouts are suitable, in particular polygonal, for example triangular or rectangular geometries.

The cutouts are preferably delimited by impressions which are produced by way of stamping. However, impressions which are produced by rolling and delimit cutouts in the blade body are also possible in principle.

BRIEF DESCRIPTION OF THE DRAWINGS

Further advantages and expedient embodiments can be found in the description of the figures and the drawings, in which.

In the figures, identical components have been provided with identical reference signs.

The figures each relate to a saw blade for a power tool having an oscillating, reciprocating working movement in translation. The power tool is in particular a portable power tool, preferably a jigsaw or reciprocating saw.

DETAILED DESCRIPTION

Figure 1:
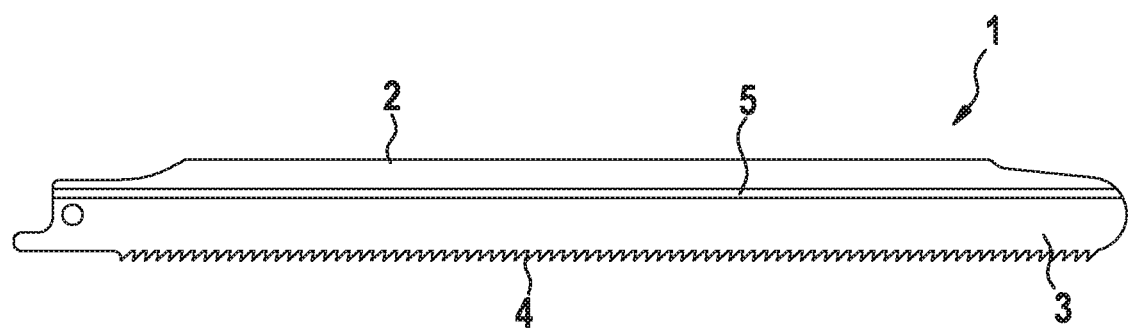
FIG. 1 shows a side view of a saw blade for a jigsaw or reciprocating saw.

The saw blade 1 according to FIG. 1 comprises a blade body 2 and a fixing shank 3 via which the saw blade is connected to a receiving device of the power tool. The blade body 2 and the fixing shank 3 are configured in one piece. A longitudinal edge of the blade body 2 forms a cutting edge 4 having cutting teeth which extend between the fixing shank 3 and the front tip of the blade body 2. The cutting edge 4 is configured in a rectilinear manner, but the cutting edge 4 may if appropriate also be embodied so as to be slightly curved in a convex manner.

The saw blade 1 has been provided with a rectilinear impression 5 which extends in the longitudinal direction of the saw blade 1 and along the entire axial length of the saw blade, that is to say over both the fixing shank 3 and the blade body 2. The impression 5 is configured in a linear manner and has an only small width. The impression 5 is preferably produced by stamping, but may if appropriate also be produced by rolling and results in strain hardening of the saw blade 1, with the result that the tension properties and vibration transmission properties change. When the impression 5 is produced, no material is removed from the saw blade 1.

Figure 2:
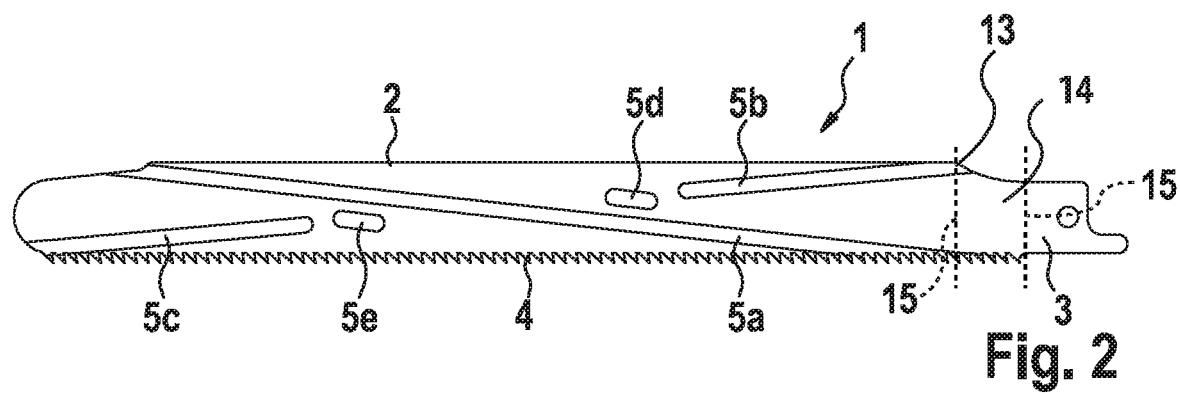
FIG. 2 shows an embodiment of a saw blade with impressions.

FIG. 2 illustrates a variant embodiment of the saw blade 1, in which a plurality of strip-form impressions 5 have been introduced into the blade body 2, said impressions 5 extending into the transition region 14 to the fixing shank 3. A "transition region" as that term is used herein is defined as the portion of a saw blade between a fixing shank, which ends at the rearmost tooth of the cutting edge, and a blade body, which ends at a proximal location at which the height of the height of the saw blade begins to decrease from the height in the blade body, proximal corner 13 in the embodiment of FIG. 2. The transition region 14 in FIG. 2 is identified by dotted lines 15. A first impression 5a extends diagonally between the tip of the blade body 2 and the opposite transition region 14 to the fixing shank 3. Two further rectilinear, strip-form impressions 5b, 5c are likewise oriented diagonally and enclose an angle with the first diagonal 5a, wherein the two impressions 5b and 5c each extend only over a subregion. In addition, two smaller impressions 5d and 5e have been introduced, said smaller impressions 5d and 5e each being arranged between the end side of the impression 5b and 5c, respectively, and the continuously configured diagonal 5a.

In the exemplary embodiment according to FIG. 2, the impressions are configured in a strip-form manner with a defined width which is preferably at most 3 mm.

Figure 3:
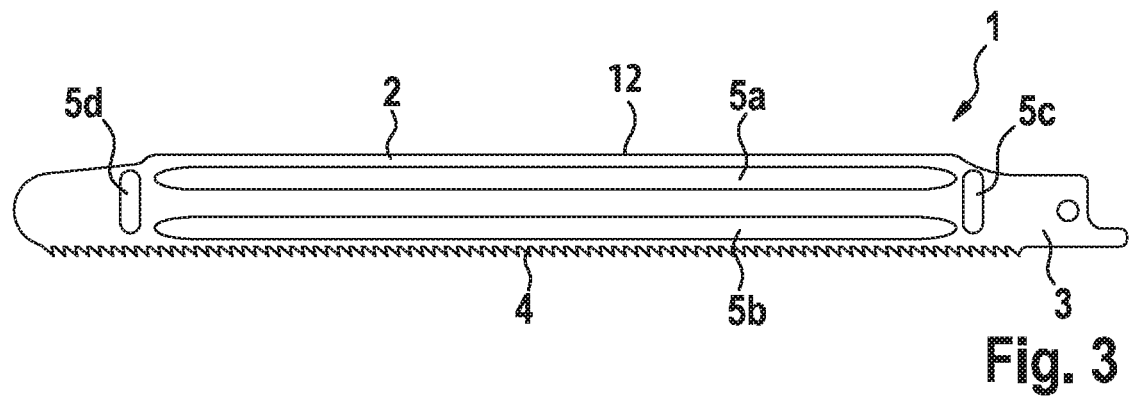
FIG. 3 shows another embodiment of a saw blade with impressions.

In the exemplary embodiment according to FIG. 3, the blade body 2 has two parallel impressions 5a, 5b that extend in the axial direction, said impressions 5a, 5b being configured in a rectilinear and strip-form manner and each being at a small distance from the cutting edge 4 and from the opposite lateral edge 12, respectively, of the blade body. Located in the region of their end edges are impressions 5c and 5d that extend in the transverse direction, wherein the first impression 5c arranged in the transverse direction is arranged in the transition region 14 between the blade body 2 and the fixing shank 3 and the opposite impression 5d extending in the transverse direction is arranged next to the tip of the blade body 2.

Figure 4:
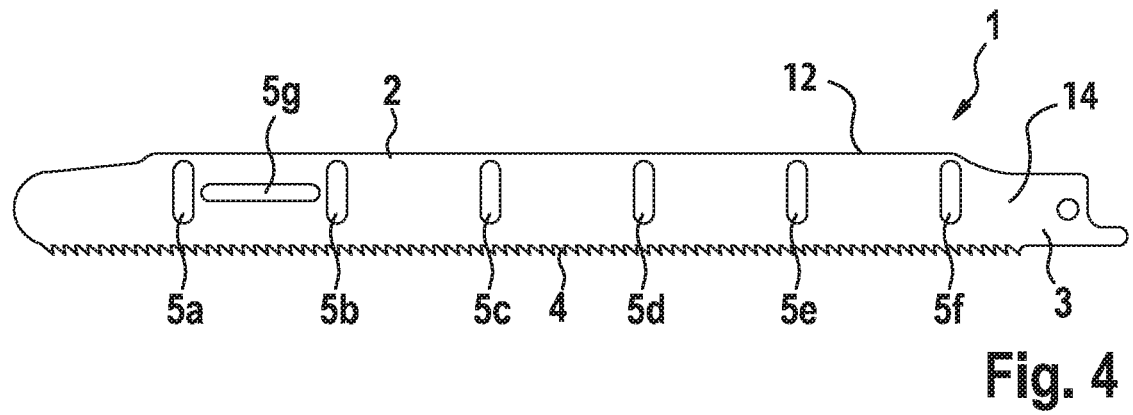
FIG. 4 shows another embodiment of a saw blade with impressions.

In the exemplary embodiment according to FIG. 4, a total of six strip-form extensions 5a to 5f that extend in the transverse direction and are configured in a rectilinear manner have been introduced into the blade body 2 and are each located at a distance from the cutting edge 4 and from the opposite lateral edge 12, respectively, of the blade body 2. The impression 5f is located in the transition region 14 between the blade body 2 and the fixing shank 3. In addition, between the first impression 5a that is located next to the tip and extends in the transverse direction and the subsequent, spaced-apart impression 5b, an impression section 5g has been introduced, said impression section 5g extending in the longitudinal direction and approximately centrally in the blade body 2.

Figure 5:
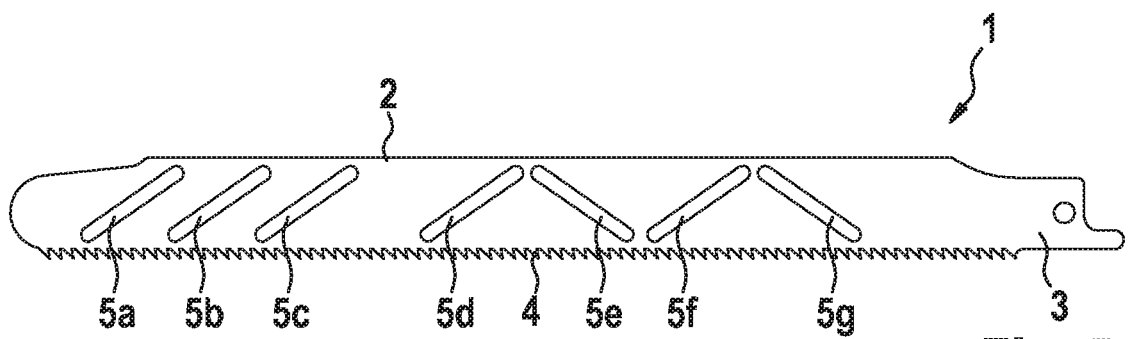
FIG. 5 shows another embodiment of a saw blade with impressions.

In the exemplary embodiment according to FIG. 5, a plurality of obliquely extending impressions 5a to 5g have been introduced into the blade body of the saw blade 1, said impressions 5a to 5g each being located at an angle of approximately 45° to the longitudinal axis. The first three impressions 5a to 5c located next to the tip extend parallel to one another. The pairs of impressions 5d and 5e, and 5f and 5g each form a triangular configuration.

Figure 6:
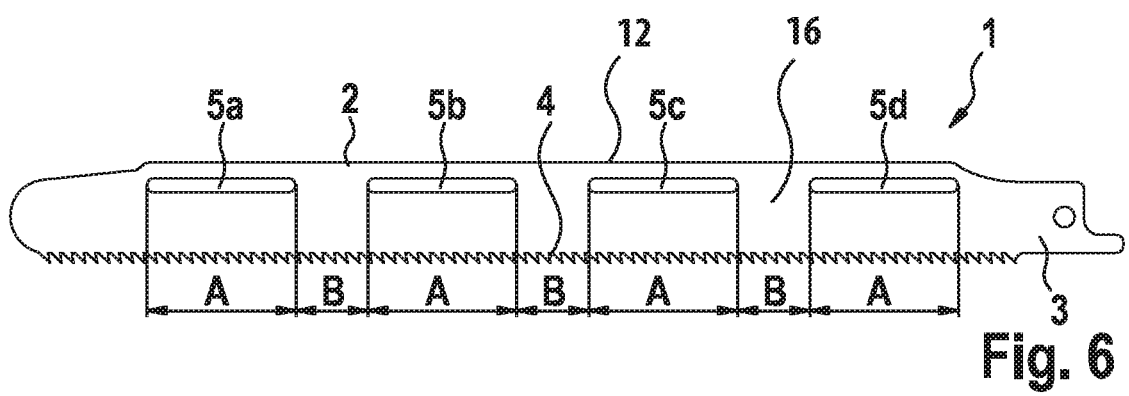
FIG. 6 shows another embodiment of a saw blade with impressions.

In the exemplary embodiment according to FIG. 6, a total of four strip-form impressions 5a to 5d that are each configured in a rectilinear manner have been introduced into the blade body 2 of the saw blade 1, said impressions 5a to 5d extending in the longitudinal direction and being located in an asymmetrical manner in the lateral surface 16 of the blade body 2. The impressions 5a to 5d are arranged next to the lateral edge 12 which is located opposite the cutting edge 4; the distance from the lateral edge 12 is smaller than from the cutting edge 4. It can also be seen that all of the extensions 5a to 5d have the same length A and that the distance B between successive impressions located in a single line is the same size in each case.

Figure 7:
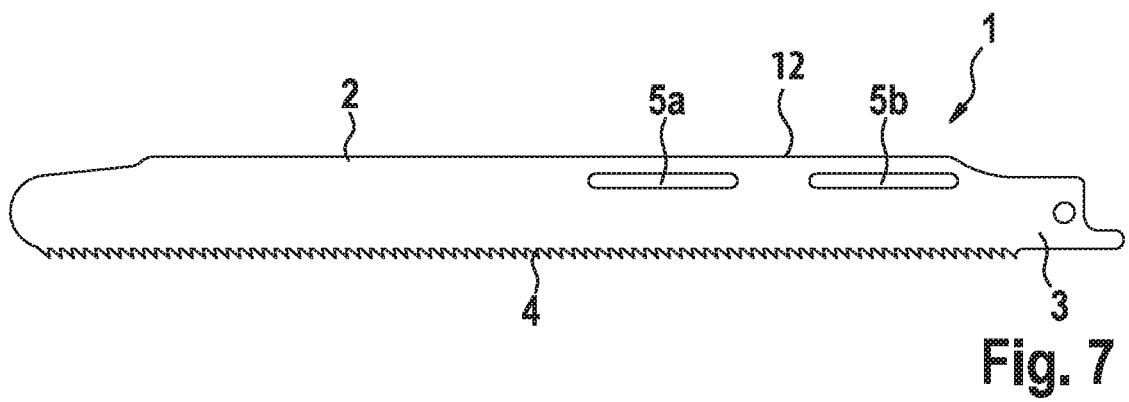
FIG. 7 shows another embodiment of a saw blade with impressions.

In the exemplary embodiment according to FIG. 7, two impressions 5a, 5b have been introduced into the blade body 2, said impressions 5a, 5b being arranged, in a similar manner to the exemplary embodiment according to FIG. 6, in each case in a rectilinear and eccentric manner and being arranged next to the lateral edge 12 opposite the cutting edge 4. The two rectilinear impressions 5a, 5b are located in the rear part, facing the fixing shank 3, of the blade body 2.

Figure 8:
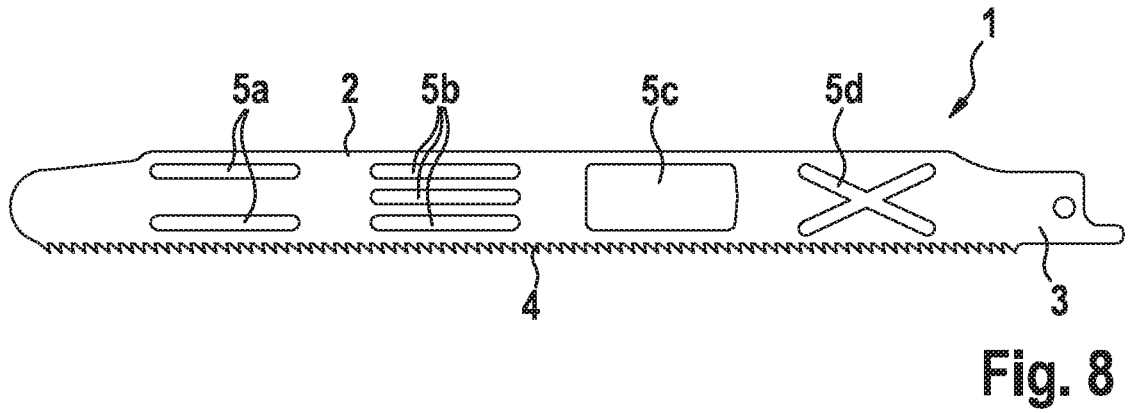
FIG. 8 shows another embodiment of a saw blade with impressions.

In the exemplary embodiment according to FIG. 8, a plurality of differently configured impressions 5a, 5b, 5c and 5d have been introduced into the saw blade 1. The impressions 5a are configured in a strip-form manner and in a manner extending in the longitudinal direction and are located next to the tip of the saw blade 1. The subsequent impressions 5b are likewise configured in a strip-form manner and in a manner extending in the longitudinal direction; in contrast to the two impressions 5a, in this case three impressions 5b are provided. Thereafter, there is an impression 5c in the form of a planar rectangle. Subsequently, an impression in the form of a cross has been introduced into the blade body 2 next to the fixing shank 3.

Figure 9:
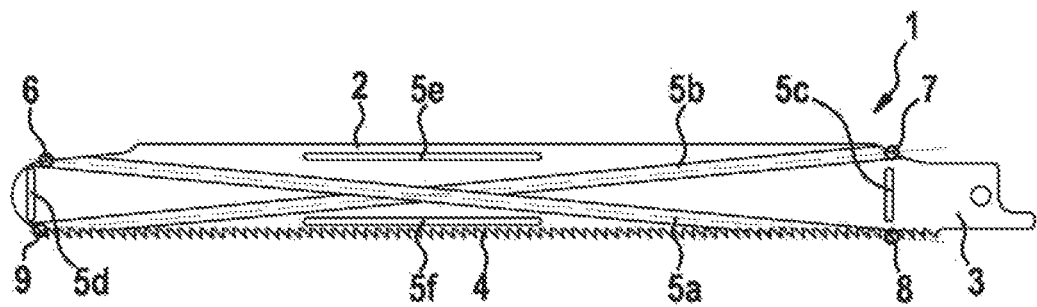
FIG. 9 shows another embodiment of a saw blade with impressions.

FIG. 9 illustrates a further variant embodiment of a saw blade 1, into the blade body 2 of which various impressions 5a to 5f have been introduced. Two impressions 5a, 5b extend diagonally between the corners 6, 7, 8 and 9 of the at least approximately rectangular blade body 2. The diagonally extending impressions 5a and 5b can intersect, wherein optionally at least one of the impressions has an interruption in order to avoid impressions located one on top of the other.

Furthermore, two impressions 5e and 5f have been introduced into the blade body 2, said impressions 5e and 5f extending next to the cutting edge 4 or to the lateral edge 12 opposite the cutting edge 4, that is to say in the longitudinal direction of the saw blade. The impressions 5e and 5f extending in the longitudinal direction have a shorter length than the blade body 2, but the longitudinal axes of the impressions 5e and 5f intersect the corners 6 and 7, and 8 and 9, respectively.

In each case two corners 7 and 8, and 6 and 9, respectively, in the regions located at the rear and at the front, respectively, of the blade body 2 are connected by impressions 5c and 5d, respectively, which extend in the transverse direction, that is to say transversely to the longitudinal axis of the saw blade. The impressions 5c and 5d may connect the respective corners directly together; however, embodiments in which the impressions are configured in a shorter manner in the transverse direction, such that the longitudinal axes of the impressions lead through the corners, are also possible.

Overall, the impressions form a frame-like construction which significantly improves the strength of the blade body 2. In principle, it is sufficient to provide for example only two diagonals 5a and 5b between the corners 6 and 8, and 7 and 9, respectively, in order to achieve strain hardening of the blade body in the manner of a frame. As an alternative, impressions 5c, 5d, 5e and 5f that extend only in the longitudinal direction or in the transverse direction and extend between the corners are provided. In each case, it is possible for the impressions to directly connect the corners or each to be located at a distance from the closest corner. Furthermore, a combination of diagonally extending impressions and impressions extending in the longitudinal direction or transverse direction, as is illustrated in FIG. 9, is suitable.

Figure 10:
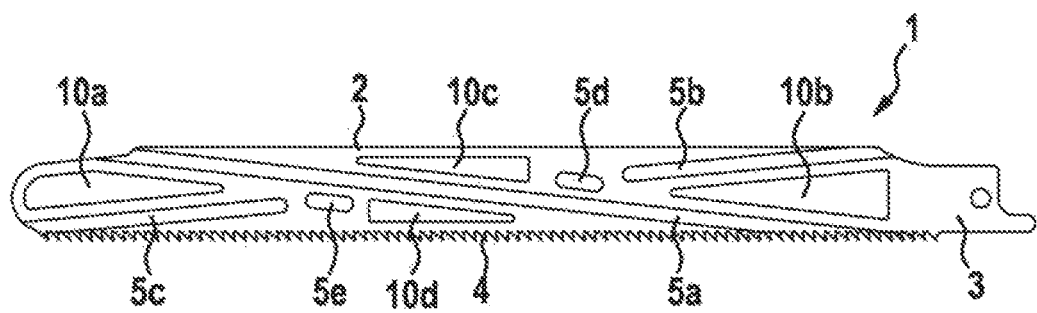
FIG. 10 shows a saw blade with impressions and cutouts.

FIG. 10 illustrates a further exemplary embodiment in which cutouts 10a to 10d have been additionally introduced into the blade body 2 of the saw blade 1, with the result that the mass and the mass moment of inertia of the saw blade are reduced. At the same time, in order to improve the rigidity and strength, impressions 5a to 5e have been introduced, said impressions 5a to 5e corresponding to those according to FIG. 2 in the exemplary embodiment. The cutouts 10a to 10d are each delimited by at least one impression, optionally by two different impressions. Furthermore, it is also possible for one or more cutouts to be delimited all around by impressions.

Figure 11:
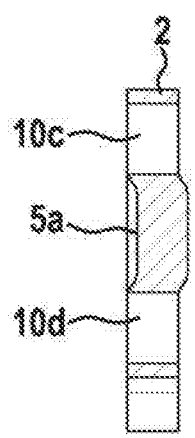
FIG. 11 shows the saw blade from FIG. 10 in section.

FIG. 11 shows a section through the blade body according to FIG. 10 in the region of the cutouts 10c, 10d. It can be seen that the impression 5a has been introduced into the blade body 2 by way of stamping, such that on one lateral surface of the blade body 2 a depression is produced and on the opposite lateral surface of the blade body an elevation is produced. The depression or elevation may have been indented into or protrude from the respective lateral surface by for example 0.1 mm or more.

Figure 12:
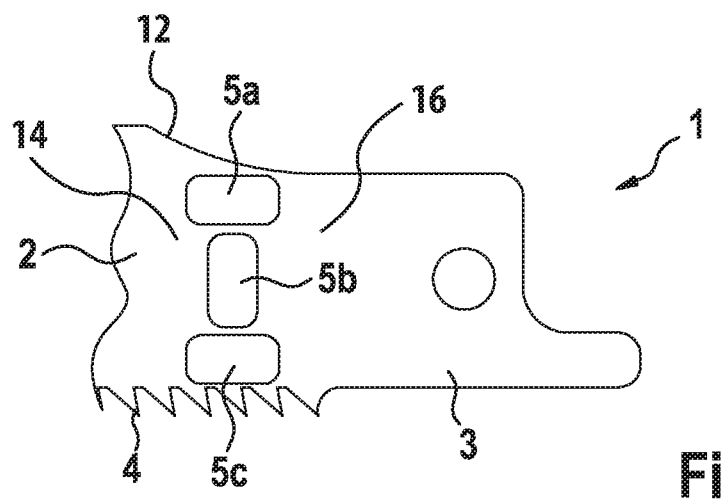
FIG. 12 shows the fixing shank of a saw blade and the transition region to the blade body into which impressions have been introduced.

In the exemplary embodiment according to FIG. 12, a total of three impressions 5a, 5b, 5c, which are distributed in the transverse direction, have been introduced in the lateral surface 16 of the transition region 14 between the blade body 2 and the fixing shank 3. The impressions 5a to 5c are each configured in a linear manner and form the periphery of a geometric pattern which is approximately rectangular. The impressions 5a and 5c are each located next to the lateral edge or cutting edge 4, and the impression 5b is located centrally between the outer impressions 5a and 5c.

Figure 13:
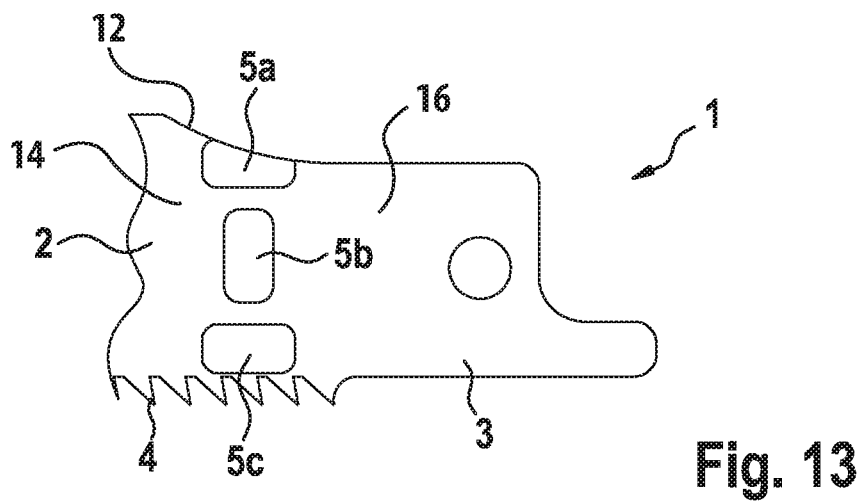
FIG. 13 shows a similar illustration to FIG. 12, but with an impression that extends as far as the upper edge of the saw blade.

The exemplary embodiment according to FIG. 13 corresponds substantially to the exemplary embodiment according to FIG. 12, but with the difference that the upper impression 5a located opposite the cutting edge 4 extends as far as the upper lateral edge 12.

Figure 14:
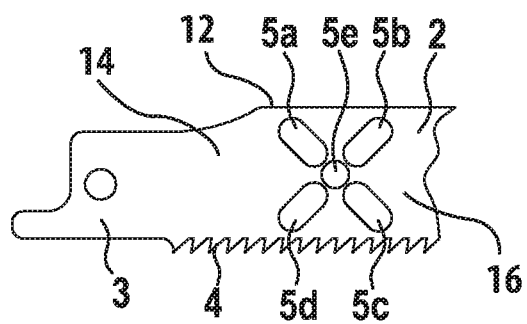
FIG. 14 shows the fixing shank of a saw blade and the transition region to the blade body in a further variant embodiment.

In the exemplary embodiment according to FIG. 14, a plurality of impressions 5a to 5e have likewise been introduced into the blade body 2 in the immediate vicinity of the fixing shank 3. In a similar manner to the exemplary embodiments according to FIGS. 12 and 13, on account of tension displacement, a potential breaking line out of the peripheral region of clamping jaws which engage around the fixing shank 3 in the mounted state is displaced from the fixing shank 3 into the blade body 2, which has greater strength. As a result of the introduction of the impressions, the strength in the transition section, subjected to high loading, in the blade body 2 is further increased. According to FIG. 14, the impressions 5a to 5e are embodied in the form of a cross, wherein the impressions do not intersect.

Figure 15:
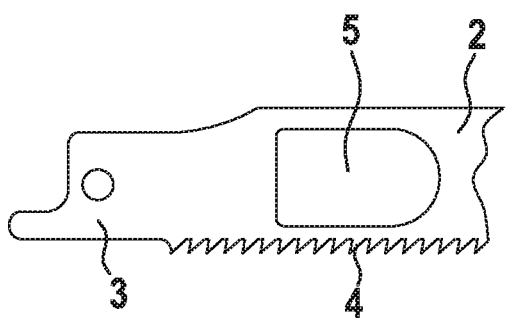
FIG. 15 shows the fixing shank of a saw blade and the transition region to the blade body in a further variant embodiment.

In the exemplary embodiment according to FIG. 15, the impression 5, which has likewise been introduced into the blade body 2 in the immediate vicinity of the fixing shank 3, is configured in a planar manner and has an approximately rectangular shape having a rounded narrow side.

I claim:

1. An integrally formed saw blade for a power tool, comprising:
   a cutting edge extending along an axis from a distal front tip of the saw blade to a proximal rear portion of the saw blade, the cutting edge including a first portion with cutting teeth and a second portion with no cutting teeth;
   a lateral edge extending along the axis from the distal front tip of the saw blade to the proximal rear portion of the saw blade;
   a blade portion having a first maximum height defined by the cutting edge and the lateral edge, the blade portion terminating at a proximal corner defined by the lateral edge;
   a fixing shank having a second maximum height defined by the cutting edge and the lateral edge, the fixing shank terminating at the first portion, the second maximum height less than the first maximum height;
   a transition region extending from the fixing shank to the blade portion; and
   at least two impressions formed in the transition region and not extending into the blade portion, the at least two impressions spaced apart from one another.

2. The integrally formed saw blade of claim 1, wherein:
   the at least two impressions include a first impression and a second impression;
   the first impression includes a first impression portion extending along the axis; and
   the second impression includes a second impression portion extending along the axis parallel to the first impression portion.

3. The integrally formed saw blade of claim 1, wherein:
   the at least two impressions include a first impression and a third impression;
   the first impression includes a first impression portion extending along the axis; and
   the third impression includes a third impression portion extending perpendicular to the axis.

4. The integrally formed saw blade of claim 1, wherein:
   the at least two impressions include a first impression, a second impression, and a third impression.

5. The integrally formed saw blade of claim 4, wherein:
   the first impression includes a first impression portion extending along the axis; and
   the second impression includes a second impression portion extending along the axis parallel to the first impression portion.

6. The integrally formed saw blade of claim 5, wherein:
   the third impression includes a third impression portion extending perpendicular to the axis.

7. The integrally formed saw blade of claim 6, wherein:
   the third impression is located between the first impression and the second impression.

8. The integrally formed saw blade of claim 1, further comprising:
   at least two ridges formed in the transition region and not extending into the blade portion, the at least two ridges spaced apart from one another.

9. The integrally formed saw blade of claim 8, wherein:
   the at least two ridges include a first ridge and a second ridge;
   the first ridge includes a first ridge portion extending along the axis; and the second ridge includes a second ridge portion extending along the axis parallel to the first ridge portion.

10. The integrally formed saw blade of claim 9, wherein each of the at least two impressions corresponds to a respective one of the at least two ridges.

11. The integrally formed saw blade of claim 8, wherein:
the at least two ridges include a first ridge and a third ridge;
the first ridge includes a first ridge portion extending along the axis; and
the third ridge includes a third ridge portion extending perpendicular to the axis.

12. The integrally formed saw blade of claim 11, wherein each of the at least two impressions corresponds to a respective one of the at least two ridges.

13. The integrally formed saw blade of claim 8, wherein:
the at least two ridges include a first ridge, a second ridge, and a third ridge.

14. The integrally formed saw blade of claim 13, wherein:
the first ridge includes a first ridge portion extending along the axis; and
the second ridge includes a second ridge portion extending along the axis parallel to the first ridge portion.

15. The integrally formed saw blade of claim 14, wherein:
the third ridge includes a third ridge portion extending perpendicular to the axis.

16. The integrally formed saw blade of claim 15, wherein:
the third impression is located between the first impression and the second impression.

17. The integrally formed saw blade of claim 16, wherein each of the at least two impressions corresponds to a respective one of the at least two ridges.

* * * * *